United States Patent Office 3,453,976
Patented July 8, 1969

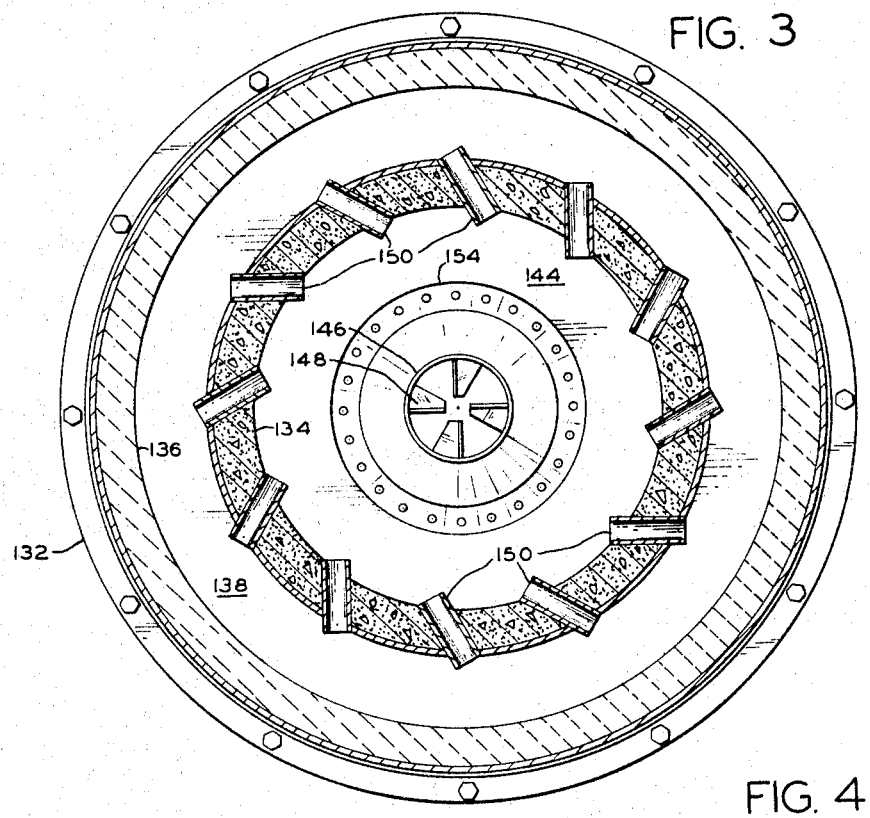
FIG. 3
FIG. 9
FIG. 4
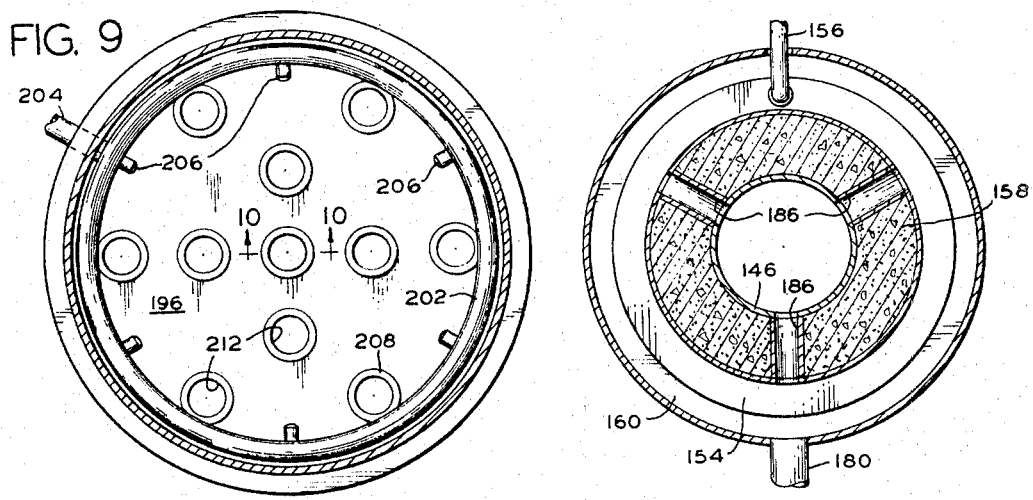

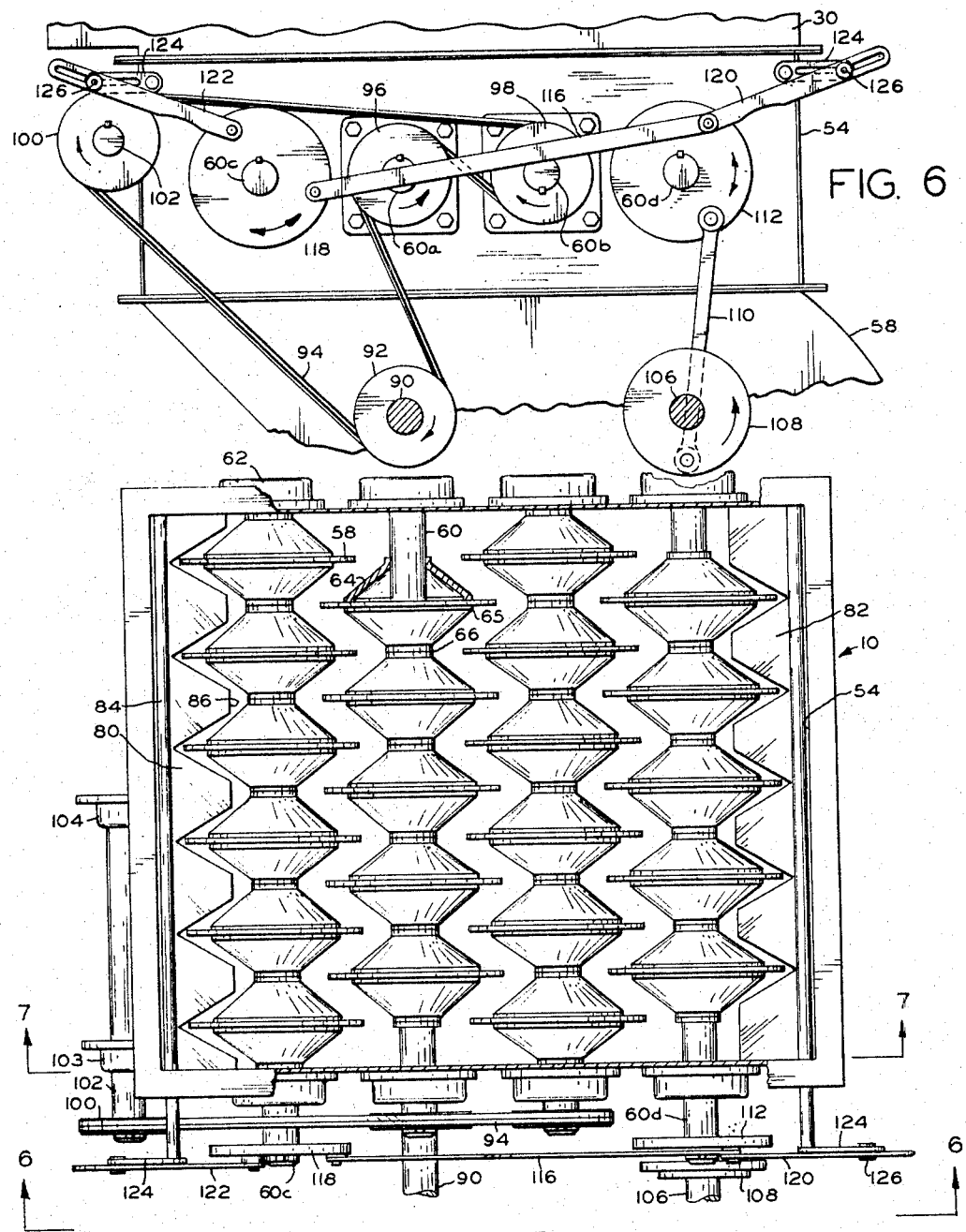

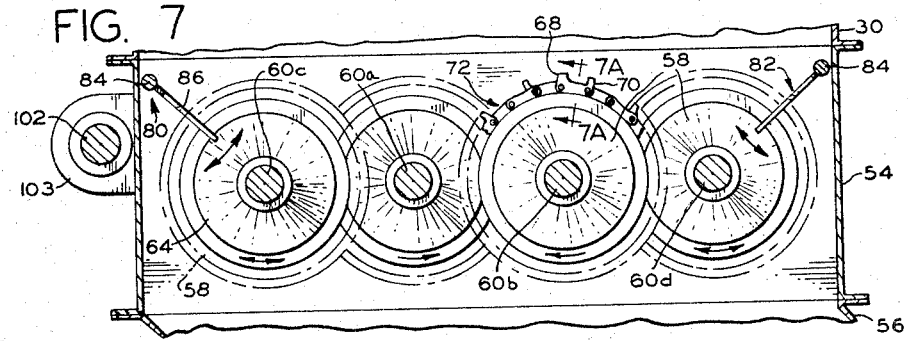
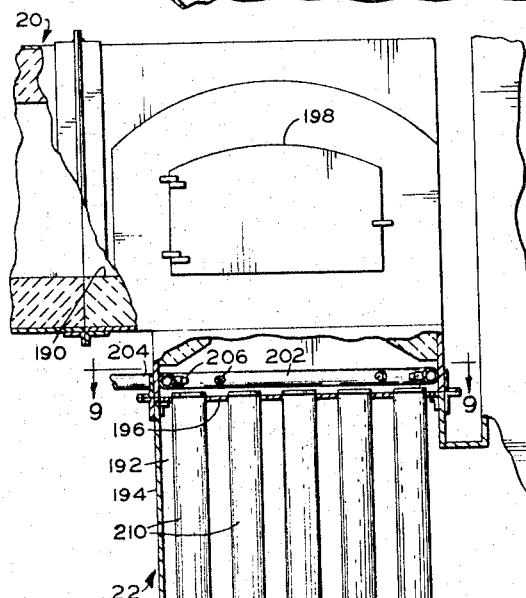
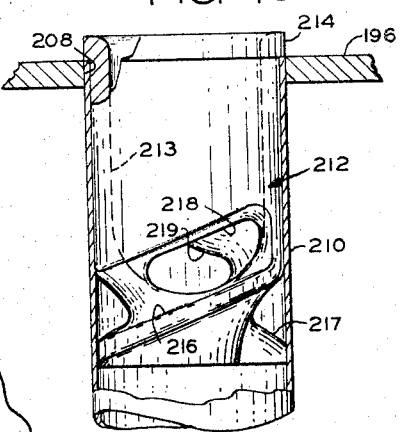
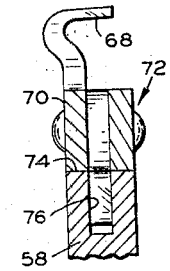

3,453,976
METHOD AND APPARATUS FOR DESTROYING BULK PAPER AND OTHER BULK MATERIALS
Roy B. Burden, Jr., and Ernest J. O'Gieblyn, Portland, Oreg., assignors, by mesne assignments, to General Incinerators of California, Inc., San Diego, Calif., a corporation of California
Filed Jan. 30, 1967, Ser. No. 612,654
Int. Cl. F23b 1/38; F23r 1/14
U.S. Cl. 110—18                      20 Claims

ABSTRACT OF THE DISCLOSURE

In accordance with the disclosure, paper in bulk quantities is fed into a slasher unit which reduces the material to small particles of a size readily suspendable in air. The slasher unit includes a series of closely interrelated oscillating and rotating discs, each having a series of cutter elements mounted on its outer periphery. As the discs spin, the paper is chopped and shredded to the desired size. Further reduction in size can be accomplished by directing the particles from the slasher through another slasher unit or a hammermill, if desired. A blower then carries the particles to a primary burner tube wherein air jets whirl the particles in suspension while they are ignited by the flame of an auxiliary fuel-fired burner ring, and thus burned. Combustion continues and is completed in a furnace into which the burner tube opens. The products of combustion flow from the furnace into a gas scrubber, where they are cooled and washed by a water spray to remove any suspended solids from the furnace gases. Settling of the solids continues in a plenum chamber portion of the scrubber, before an exhaust fan carries the smokeless gases into the atmosphere.

---

The present invention relates to the destruction, primarily by combustion, of various materials, and more particularly to a method and apparatus for destroying bulk paper and other bulk materials. The invention has particular utility for the rapid and complete destruction of confidential papers, although it has more general utility as well.

OBJECTS OF THE INVENTION

Objects of the invention are to provide:

(1) A new and improved method of destroying bulk materials and especially paper;

(2) A method as aforesaid that will destroy bulk paper and other materials completely, without any substantial ash or smoke residue;

(3) A new and improved apparatus for carrying out the aforesaid method with maximum speed and efficiency;

(4) A method and apparatus as aforesaid which are particularly suited for the destruction of confidential papers because of the speed and completeness of the destruction without leaving any identifiable residue to sift or re-burn;

(5) A new and improved slasher mechanism as a component part of the apparatus for reducing bulk materials to air-suspendable particles;

(6) A new and improved primary burner as a component part of the apparatus for initiating and carrying out combustion, including an air-cooled burner ring;

(7) A new and improved gas scrubber unit as a component part of the apparatus, including a plenum chamber, for settling out the solid components of the primarily gaseous products of combustion;

(8) An apparatus as aforesaid which is simple and inexpensive to construct, operate and maintain, and which is adaptable for completely automatic operation.

The above and other objects and advantages of the invention will become more apparent from the following detailed description, which proceeds with reference to the accompanying drawings, wherein:

FIG. 3 is a transverse sectional view through the primary burner taken along the line 3—3 of FIG. 2;

FIG. 4 is a transverse sectional view through the primary burner taken along the line 4—4 of FIG. 2;

FIG. 5 is a horizontal sectional view, on a larger scale, through the slasher unit, taken along the line 5—5 of FIG. 1;

FIG. 6 is a fragmentary side elevational view of the slasher unit showing the drive therefor, taken along the line 6—6 of FIG. 5;

FIG. 7 is a vertical sectional view through the slasher unit taken along the line 7—7 of FIG. 5;

FIG. 7A is a fragmentary sectional view on an enlarged scale through a peripheral edge portion of one of the cutter discs taken along the line 7A—7A of FIG. 7;

FIG. 8 is an elevational view of the gas scrubber and a portion of the plenum chamber components of the apparatus, partly in section;

FIG. 9 is a horizontal sectional view through the gas scrubber taken along the line 9—9 of FIG. 8; and FIG. 10 is a fragmentary vertical sectional view through the upper end of one of the gas scrubber tubes showing a spinner device mounted therein.

DETAILED DECRIPTION

*General assembly*

Figure 1:
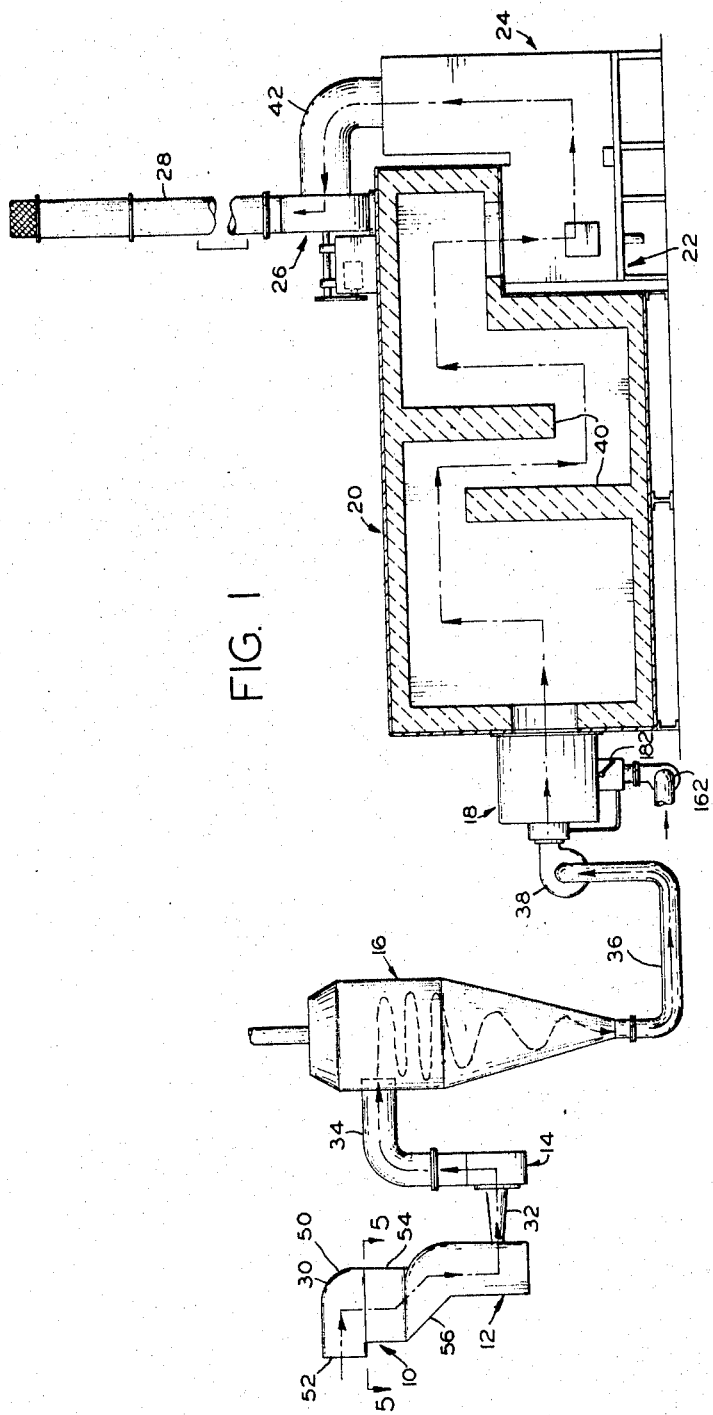
FIG. 1 is a schematic side elevational view, partly in section, showing the complete apparatus for carrying out the method of the invention.

With reference to FIG. 1 of the drawings, the apparatus is composed of a series of distinct but closely interrelated components including in order, proceeding downstream in the direction of material flow, a slasher unit 10, a hammermill 12, a blower 14, a cyclone 16, a primary burner 18, a furnace 20, a gas scrubber 22, including a plenum chamber 24, and exhaust fan 26 and an exhaust stack 28. Material to be destroyed is fed into an upper receiving portion 30 of the slasher unit, which shreds the material into particles, which in turn drop into the hammermill. The hammermill reduces the particles into small, confetti-sized particles, which are then carried through a duct 32 into the fan 14, which blows the particles through another section of duct 34 to the cyclone. The cyclone is of conventional construction, well known in the wood-waste handling field, and serves to remove excess air from the line which could not be handled by the remainder of the system. From the cyclone the particles are drawn through a duct section 36 by another fan 38 at the upstream end of the primary burner. This fan blows the particles into the main chamber of the primary burner tube where they are ignited and burned. The burning particles are carried into the main furnace wherein combustion is completed while the products of combustion flow around baffles 40 therein.

From the furnace the products of combustion, including both gases and gas-borne minute solids, enter the upper end of the gas scrubber where the gases are cooled and the minute solids separated therefrom by washing. Some settling continues in the plenum chamber through slowing of the gas flow, after which the exhaust fan 26 pulls the cleansed gases through a passage 42 into the exhaust stack and expels them, smokeless, therefrom.

Certain of the individual components of the foregoing described destructor apparatus are key elements to the success and efficiency of the overall system and are believed to be unique in certain respects and thus will be described in greater detail below.

Slasher unit

Slasher unit 10, shown in detail in FIGS. 5, 6 and 7, has a vertically extending housing 50 including the previously mentioned upper receiving portion 30 with an intake opening 52 (FIG. 1), an intermediate housing portion 54 of rectangular cross section housing the slasher mechanism, and a lower, chute portion 56 which descends at a slight inclination to the hammermill 12. Intermediate housing portion 54 houses four horzontally spaced rows of cutter discs 58, with all of the discs in each row being fixedly mounted on one of four driven shafts 60. Each shaft is journaled in bearings 62 at opposite sides of the housing. The discs on each shaft are spaced from each other and from the sides of the housing by frusto-conical spacer cups 64 which may be affixed to the shaft by set screws (not shown) or other suitable means. Each cup includes a wide base portion 65 which abuts a disc, and a surface which tapers inwardly and away from the cutter disc to a narrow base portion 66. There are two such spacer cups between each adjacent pair of cutter discs, with the narrow bases of the two cups abutting one another midway between the pair of discs. These cups not only serve as spacers, but also guide the material to be shredded toward the cutting elements of a disc in an adjacent row and help prevent clogging of material between adjacent discs.

Each disc 58 has a series of cutting elements 68 mounted on its outer periphery. In the illustrated embodiment these cutting elements form part of conventional cutter links 70 of a length of saw chain 72 such as the illustrated so-called "chipper" type saw chain shown in FIGS. 7 and 7A and used commonly in the timber cutting field. To receive the chain, the peripheral edge 74 of each disc is provided with a central and radially extending slot 76 which receives a projecting wing portion of the center links 78 of the chain while the side links engage the peripheral edge. Pins (not shown) extending laterally through the peripheral edge portion of each disc and through certain of the center links may be provided at intervals about the disc to anchor the chain against circumferential slippage on the disc, although these are not absolutely necessary, for centrifugal force during rotation or oscillation of the discs is usually sufficient to maintain the chain in place.

The unusually effective cutting action of the slasher mechanism is achieved, to a large extent, through the specific interrelationship of the cutter discs in each row with the cutter discs in the adjacent rows. As shown in FIG. 5 the peripheral portions of the discs in each row have an interdigital relationship with the same portions of the discs in each adjacent row. That is, the discs in each row project into the spaces between discs in the adjacent rows and in line with the narrow neck defined by the spacer cups in the adjacent rows. With the discs thus interrelated, the two center cutter disc shafts 60a and 60b are rotated in opposite directions, and specifically in directions toward the discs on the two end shafts 60c and 60d as viewed from above the discs. At the same time the two end shafts oscillate. Thus material fed onto the cutter discs from above are fed by the interaction of the discs into the spaces therebetween to be shredded by the cutting elements into particles, which then pass downwardly between the discs into the chute below.

Referring to FIGS. 5 and 7, finger-like kicker plates 80, 82 are provided at opposite ends of the housing to prevent a pile-up and jamming of material at these points. Such plates are mounted on kicker shafts 84 at a level slightly above the level of the latter shafts. Each plate has a series of fingers 86 which extend into the spaces between adjacent cutter discs in interdigital fashion. The fingers are inclined downwardly from their shafts toward the adjacent disc shafts 60c and 60d. The shafts, and thus the kicker plates, are oscillated through a small angle to propel material moved to the ends of the housing by the discs back toward the center of the housing.

Referring to FIGS. 5 and 6, the drive mechanism for the slasher unit includes a pair of independent drive motors (not shown), one for rotating the center pair of cutter disc shafts and the other for driving the oscillating end cutter disc shafts and kicker shafts. One motor has a drive shaft 90 which has a pulley 92 at its outer end about which a belt 94 is trained. Belt 94 is also trained about driven pulleys 96 and 98 on disc shafts 60a and 60b, respectively, and about an idler pulley 100 on an idler shaft 102 journaled in bearings 103 and 104 at one end of the slasher housing, in the manner shown in FIG. 6, so as to rotate the cutter discs on the two center shafts in the desired counterclockwise and clockwise directions, respectively.

The other drive motor has a drive shaft 106 having a crank disc 108 fixed to its outer end. A crank rod 110 is pivoted at one end to disc 108 and at its opposite end to a crank disc 112 on end cutter disc shaft 60d, in such a manner that rotation of the drive shaft will oscillate the disc shaft through an angle of from about seventy to one hundred twenty degrees. A connecting rod 116 connects crank disc 112 to a crank disc 118 on end cutter disc shaft 60c so as to transmit the oscillatory motion of the former shaft to the latter in synchronous fashion. Crank discs 112 and 118 also carry crank bars 120 and 122, respectively, which connect with levers 124 at corresponding ends of kicker shafts 84 through lost motion connections 126 to transmit a portion of the oscillatory motion of the end cutter disc shafts 60c and 60d to their adjacent kicker shafts, and thus to the kicker plates.

Primary burner

Figure 2:
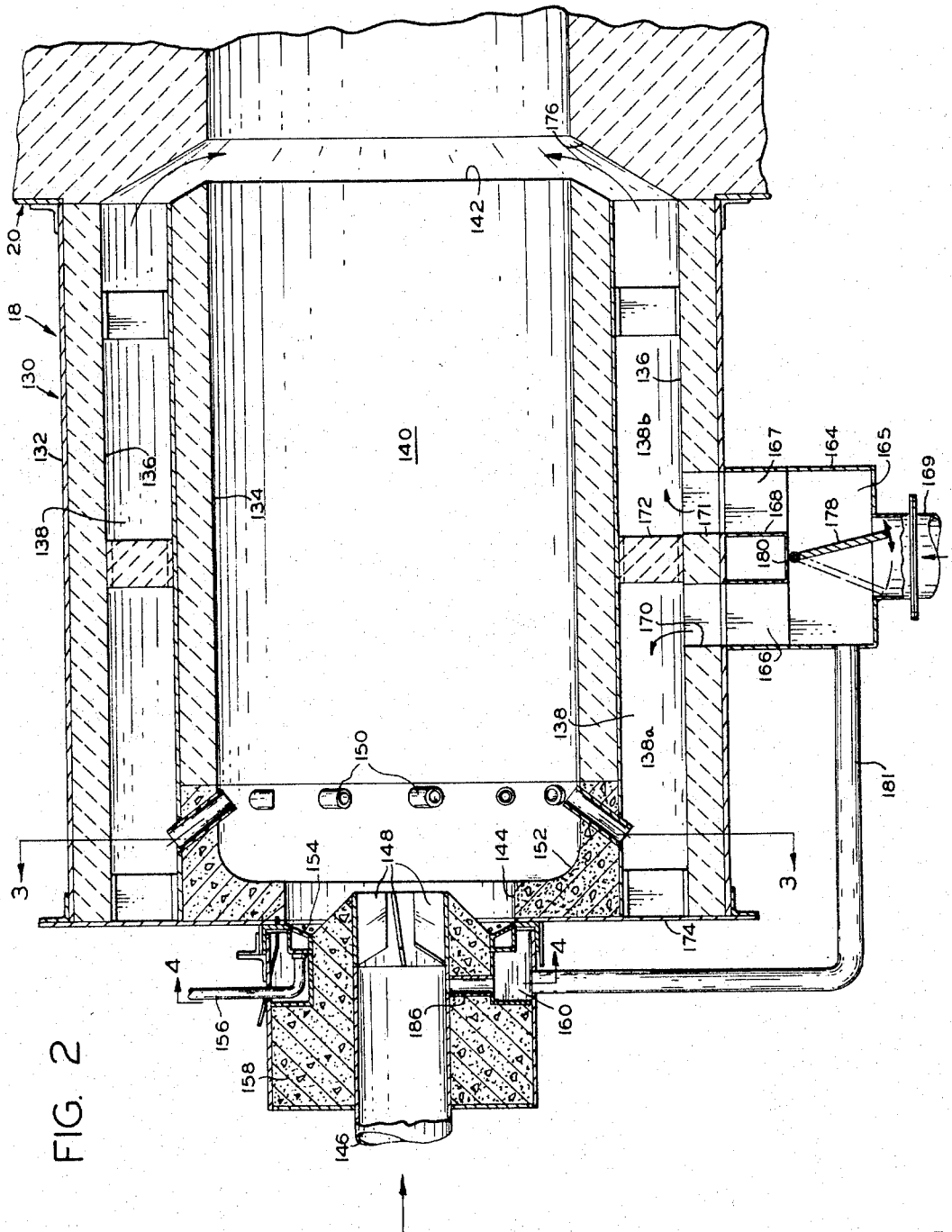
FIG. 2 is a longitudinal sectional view on a larger scale through the primary burner component of the apparatus of FIG. 1.

Referring especially to FIGS. 2 and 3, primary burner 18 includes a burner tube 130 composed of an outer tubular steel shell 132, and an inner refractory liner 134 and an outer refractory liner 136 separated from each other by an insulating air space 138. The inner liner defines the peripheral wall of the main combustion chamber 140, which opens at its downstream end 142 into furnace 20. The upstream end of the main combustion chamber has an opening 144 which receives the downstream end of an infeed duct 146 leading from the material handling fan 38 (FIG. 1). Four spinner blades 148 at the downstream end of duct 146 impart a whirling motion to particles blown into the main chamber by the fan.

Within the main chamber, a series of tuyeres 150 set in a concrete inner wall base portion 152 project tangentially into the chamber just downstream from a burner ring 154 at the upstream end of the chamber surrounding end opening 144. Jets of combustion air are injected into the chamber through the tuyeres to maintain the particles whirling in suspension within the chamber while they are ignited and burned by a flame from the burner ring. The burner ring is fired with auxiliary fuel such as oil or natural gas from a source (not shown) through a supply line 156.

The material supply duct 146 and burner ring 154 are supported by a steel-jacketed concrete base portion 158. This base portion defines an annular cooling chamber, or air space, 160 behind the burner ring and into which the rear portion of the burner ring extends. Air is circulated through this chamber to cool the burner ring while the burner is operating.

A unique flow divider arrangement supplies cooling air to the burner ring, and combustion air to the tuyeres and to the downstream end of the burner tube from a common source comprising blower 162 (FIG. 1). The flow divider means includes a flow divider box 164 defining a receiving chamber 165 leading to two passages 166, 167 separated by a divider wall 168. A duct 169 leads from blower 162 into the receiving chamber, and passages 166 and 167 connect with annular air space 138 through a pair of openings 170, 171 in outer tube liner 136. Annular air space 138 is itself separated into an upstream section 138a and a downstream section 138b by an annular partition 172. The upstream section is in communication with the tuyeres and is blocked off from the exterior of the tube by a steel end plate 174. The downstream section 138b is in communication with the upstream end of the main chamber 140 at its intersection with furnace 20 through an annular passage 176. A divider plate 178 pivoted on a shaft 180 within receiving chamber 165 of the divider box regulates the rate of flow of combustion air from the blower 162 into the upstream and downstream sections of the annular air space so that the amount of combustion air admitted into the upstream and downstream ends of the main chamber of the burner tube can be carefully controlled to meet varying conditions. Adjustment of the position of the divider plate is achieved through positioning of a handle 182 formed on one end of shaft 180 outside the divider box.

Air is supplied to the cooling chamber 160 behind the burner ring through a pipe 184 from the receiving chamber of the divider box. Air that circulates within the cooling chamber eventually passes into material infeed duct 146 through passages 186 (FIGS. 2 and 4) to preheat incoming material just before it enters the main chamber.

*Gas scrubber and plenum chamber*

Referring to FIGS. 8 and 9 the gas scrubber 22 includes an upper refractory-lined chamber 190 which receives the products of combustion from furnace 20 and a lower, cylindrical chamber portion 192 defined by a steel shell 194 and separated from the upper chamber by a stainless steel plate 196. There are access doors 198 and 200 opening into the upper and lower chambers, respectively.

An annular water pipe 202 mounted within the upper chamber, just above plate 196, is supplied with water under pressure through a supply line 204. The water pipe has a series of six inwardly directed spray nozzles 206 equally spaced about the perimeter of the upper chamber for spraying and thus cooling and washing the hot products of combustion as they descend toward plate 196. Plate 196 has a series of eleven openings 208 therethrough which receive the upper ends of a corresponding number of stainless steel tubes 210. The tubes are suspended from the plates and extend downwardly into the lower chamber 192. Thus the descending products of combustion must pass through the tubes to reach the lower chamber. These products are actually urged toward the lower chamber both by the cooling effect of the water spray and by the action of the induced draft exhaust fan 26.

The products of combustion are mainly furnace gases bearing in suspension minute solid particles which, if not removed from the gases, would escape into the atmosphere in the form of smoke. As these products descend through tubes 210, a natural whirling motion is imparted to them. This cyclonic motion is given added impetus by spinner devices 212, shown most clearly in FIG. 10, which through their arrangement of openings and surfaces define a helical flow path which gases must follow in passing through the tubes. Each spinner is tubular throughout an upper section 213 and has an upper annular lip 214 by which the spinner is hung from the upper edge of its associated tube 210. A lower section of the spinner defines a pair of helical blades 216, 217 on opposite sides of the member which lead upwardly from the lower extremity of the member to a pair of opposed sidewall openings 218, 219, respectively at the lower end of tubular upper section 213.

The gas-cleansing action of the tube assemblies operates as follows. Water from the water spray flows down through the chamber along the inner walls of tubes 210. At the same time the furnace gases and gas-borne particles pass downwardly through the same tubes in a helical path. Centrifugal force flings the heavier solid components of the products of combustion toward the inner walls of the tubes where the water picks them up and washes them to the bottom of the scrub chamber. The bottom of the chamber serves as a catch basin for the water and waterborne solids. Water in the bottom of the chamber above a predetermined level is automatically carried away by a drain pipe 222 which has an upper portion 223 projecting above the bottom of the scrub chamber a distance equal to the aforementioned predetermined level.

The lower portion 192 of the scrub chamber is connected to the laterally adjacent plenum chamber 24 by a passageway 224. The volume of the plenum chamber is greater than that of the lower section of the scrub chamber so that the flow of gases entering the plenum chamber will be slowed in the latter chamber to induce the settling out of any remaining solids in suspension.

The upper end of the plenum chamber opens into the exhaust stack 28. Exhaust fan 26 induces a draft that keeps the furnace gases flowing through the scrub chamber and plenum chamber, and into the atmosphere from the stack. Because of the cleansing action of the gas scrubber and plenum chamber, the gases exhausted to atmosphere will be substantially smokeless.

In areas where fresh or salt water is unavailable, an afterburner can be substituted for the gas scrubber and plenum chamber in the illustrated destructor apparatus. A suitable afterburner for this purpose is illustrated and described in copending patent application Ser. No. 480,405 filed Aug. 17, 1965 in the name of Roy B. Burden, Jr. and entitled "Afterburner."

SUMMARY OF METHOD

In summary, the method as carried out in the foregoing apparatus includes, in order, shredding of bulk paper or other combustible material into particles of a size that can be readily suspended in air, then whirling the particles in air suspension while igniting and burning the same, and then settling any remaining suspended solids from the products of combustion before exhausting the gaseous products of combustion into the atmosphere.

The illustrated apparatus represents a preferred embodiment for carrying out the foregoing method. However, as already indicated, an afterburner could be substituted for the gas scrubber and plenum chamber. Also, the hammermill could be replaced by a second slasher mechanism similar to the one illustrated and positioned at a level just below the latter.

Having illustrated and described a preferred embodiment of the invention, and having suggested several alternative embodiments, it should be apparent to persons having skill in the art that the invention permits of modification in arrangement and detail. We claim as our invention, all such modifications as come within the true spirit and scope of the following claims.

We claim:
1. Apparatus for destroying bulk quantities of paper comprising in combination:
   shredding means for reducing the paper to particles of sufficiently small size to be suspended in an air stream,
   burner means connected downstream with said shredding means, including a primary burner tube, said tube including a burner ring near the upstream end thereof, means for subjecting said ring to a flow of air for cooling the same during the operation thereof, said burner means also including means for suspending said particles in a stream of agitated air and means for igniting and burning said particles while so suspended,
   a furnace chamber downstream from said tube, said burner tube opening into said furnace chamber,
   gas scrubbing means connected downstream of and with said burner means for removing traces of remaining suspended solids from the resulting combustion gases after combustion is at least substantially completed, and means connected downstream of and with the gas scrubbing means for exhausting the resulting substantial solids-free gases to atmosphere.

2. Apparatus according to claim 1 wherein the burner means includes a tubular primary burner means opening into a furnace having a chamber downstream from said primary burner and having interior, vertically extending partitions to cause the flow of combustion gases through the chamber to follow an undulating path, said tubular primary burner means being disposed in open communication with the furnace chamber.

3. Apparatus according to claim 1 including blower means between said shredding means and said burner means for blowing particles from said shredding means into said burner means.

4. Apparatus according to claim 1 including blower means between said shredding means and said burner means for inducing a flow of particles from said shredding means to said burner means, and cyclone means between said blower means and said burner means for removing excess air from the flow before said particles reach said burner means.

5. A primary burner for the combustible destruction of air-suspendable combustible solid comprising:
wall means defining a tubular main chamber having open entrance and exit ends,
duct means upstream from said entrance end and opening into said chamber at said entrance end,
means for feeding particulate solids to be burned through said duct means and into said chamber,
a burner ring at said entrance end arranged concentrically with respect to said chamber and having fuel openings directed into said chamber,
means defining an enclosed air space housing and surrounding a rear portion of said burner ring,
said wall means defining an annular insulating air space surrounding the periphery of said chamber and separated therefrom by a portion of said wall means, said wall means also defining passage means connecting said annular air space with said chamber adjacent the exit end thereof,
a series of ports connecting said annular air space with said chamber adjacent to and downstream from said burner ring, said ports being arranged at circumferentially spaced apart locations in the peripheral wall of said chamber,
a source of combustion supporting air including means for directing a flow of combustion supporting air from said source into said annular air space intermediate the opposite ends of said chamber and thereby causing a flow of combustion supporting air into said chamber through said ports and passage means,
adjustable flow divider means for regulating the proportion of said air entering said chamber through said ports and through said passage means,
and second passage means connecting said source to the enclosed air space surrounding the burner ring for directing a cooling flow of air to the ring.

6. A primary burner for the combustible destruction of air suspendable shredded paper comprising:
a wall means defining a tubular main chamber having entrance and exit end openings,
duct means upstream from said entrance end opening and opening into said chamber through said entrance opening,
means for feeding particulate paper to be burned through said duct means and into said chamber,
a burner ring in surrounding relationship to said entrance end opening having fuel openings directed into said chamber,
means defining an enclosed air space housing and surrounding a rear portion of said burner ring,
means for directing a flow of combustion supporting air into said chamber downstream from and adjacent to said burner ring for suspending said particulate paper within said chamber while the solids are ignited and burned within said chamber,
and means for directing a flow of air into the enclosed air space housing surrounding said burner ring to cool the same.

7. Apparatus according to claim 6 wherein said means for directing a flow of combustion supporting air into said chamber includes a series of tuyeres arranged at circumferentially spaced apart locations in the peripheral wall of said chamber and directed generally tangentially into said chamber for directing jets of air into the chamber and thereby suspending the particulate solid material in a stream of whirling combustion supporting air adjacent the burner ring.

8. Apparatus according to claim 7 including passage means for directing a flow of combustion supporting air into said chamber at said exit opening.

9. Apparatus according to claim 8 including means for regulating the quantity of air entering said chamber through said tuyeres and through said passage means.

10. Apparatus according to claim 6 wherein said wall means defines an annular insulating air space surrounding the periphery of said chamber and separated therefrom by a portion of said wall means,
first passage means connecting said annular air space with said chamber adjacent the exit opening thereof,
a series of ports connecting said annular air space with said chamber adjacent to and downstream from said burner ring, said ports being arranged at circumferentially spaced apart locations in the peripheral wall of said chamber,
a source of combustion supporting air including means for directing a flow of combustion supporting air from said source into said annular air space intermediate the opposite ends of said chamber to cause a flow of combustion supporting air into said chamber through said ports and said passage means,
adjustable flow divider means for regulating the proportion of combustion supporting air entering said chamber through said ports and through said passage means,
said means for directing a flow of air into the space surrounding the burner ring including a second passage means connecting said source to the enclosed air space surrounding said burner ring.

11. Apparatus according to claim 10 wherein said means for directing a flow of material through said duct means into said chamber includes a blower means in said duct means,
and spinner means in said duct means adjacent said entrance opening for imparting a whirling motion to the flow of material entering said chamber.

12. Apparatus according to claim 6 including passage means connecting the enclosed air space housing surrounding the burner ring with the duct means.

13. A primary burner as defined in claim 6, characterized to include:
a source of air,
means for adjustably proportioning the relative quantities of air directed to said chamber and to said air space housing.

14. A primary burner for the combustible destruction of combustible solids comprising:
(A) wall means defining a main chamber having entrance and exit end openings;
(B) duct means upstream from said entrance end opening into said chamber through said entrance opening;
(C) means for feeding solids to be burned into said chamber through the duct means;

(D) burner means adjacent the entrance end opening having fuel openings directed into the chamber;
(E) means defining an air passage at the rear portion of the burner means;
(F) means for directing a flow of combustion supporting air into said chamber downstream from and adjacent said burner means;
(G) means for directing a flow of cooling air through said passage.

15. A primary burner as defined in claim 14, characterized in that the burner means is in the form of a ring and that the passage surrounds the rear portion of the ring.

16. The steps in the method of destroying bulk paper or other combustible material, which steps consist in:
(A) first shredding the material into particles of such size that they can be suspended in a stream of air;
(B) thereafter forcing all of the shredded particles under air pressure axially into the entrance end of a cylindrical and axially, horizontally extending combustion chamber;
(C) igniting the particles at the entrance of the combustion chamber;
(D) imparting whirling movement to the ignited particles about the horizontal axis of the chamber and supplying all additional necessary air for supporting combustion, downstream of the entrance to the combustion chamber by injecting air tangentially into the combustion chamber immediately downstream of said entrance;
(E) removing all of the resulting ashes and the gases axially from the other end of the cylindrical chamber.

17. The steps in the method as defined in claim 16, which include the further step of:
(F) imparting whirling movement to the particles prior to the entrance of the particles to the combustion chamber.

18. Apparatus for destroying bulk quantities of paper and other combustible material, comprising in combination:
(A) shredding means for reducing the bulk material to particles of such small size so as to be suspended in an air stream;
(B) a cylindrical and axially, horizontally extending combustion chamber, said chamber having:
(1) an axially disposed inlet at one end for the particles,
(2) an outlet at the other end for exhausting all the ashes and gases resulting from combustion of the particles,
(3) tangentially disposed air inlets adjacent said inlet end for supplying all necessary air for supporting combustion and for imparting whirling motion to the burning particles;
(C) a centrally and axially disposed duct at the entrance to the combustion chamber;
(D) means under air pressure for forcing said particles through said duct;
(E) burner means adjacent said duct;
(F) means for feeding fuel to said burner means.

19. Apparatus as defined in claim 18, characterized to include:
(G) means in said centrally disposed duct for imparting whirling motion to the particles at the entrance to the combustion chamber.

20. Apparatus as defined in claim 18, characterized to include:
(G) means providing an air passage at the rear portion of the burner means;
(H) means for supplying cooling air to said air passage.

References Cited

UNITED STATES PATENTS

| | | |
|---|---|---|
| 830,974 | 9/1906 | Decarie. |
| 1,618,808 | 2/1927 | Burg. |
| 2,625,791 | 1/1953 | Yellott. |
| 3,064,592 | 11/1962 | Eberhardt _____ 110—7 |
| 3,244,220 | 4/1966 | Kloecker _____ 110—22 |
| 3,259,083 | 7/1966 | Evans. |
| 3,320,906 | 5/1967 | Domahidy. |
| 3,357,380 | 12/1967 | Siracusa _____ 110—8 |
| 1,817,228 | 8/1931 | Bliss. |
| 1,952,389 | 3/1934 | Staples _____ 110—3 |
| 2,614,513 | 10/1952 | Miller et al. _____ 110—7 |
| 2,702,013 | 2/1955 | Atteberry _____ 110—18 |

JAMES W. WESTHAVER, *Primary Examiner.*

U.S. Cl. X.R.

110—7, 28

PO-1050
(5/69)

UNITED STATES PATENT OFFICE
CERTIFICATE OF CORRECTION

Patent No. 3,453,976            Dated July 8, 1969

Inventor(s) Roy B. Burden, Jr., et al

It is certified that error appears in the above-identified patent and that said Letters Patent are hereby corrected as shown below:

Column 7, line 28:    "solid" should be --solids--;
           line 64:    "shredded paper" should be --combustible solids--
           line 70:    "paper" should be --solids--.

Column 8, line 6:    "paper" should be --solid material--.

SIGNED AND
SEALED
DEC 23 1969

(SEAL)
Attest:

Edward M. Fletcher, Jr.
Attesting Officer

WILLIAM E. SCHUYLER, JR.
Commissioner of Patents